Feb. 3, 1970  J. T. BILLINGS ET AL  3,493,161
WEB SUPPORT ROLLER SURFACE
Filed April 17, 1967
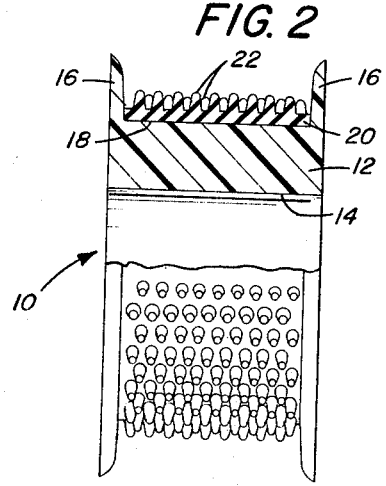
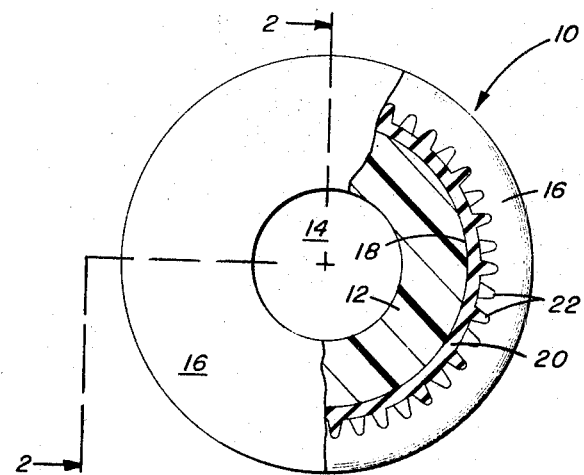
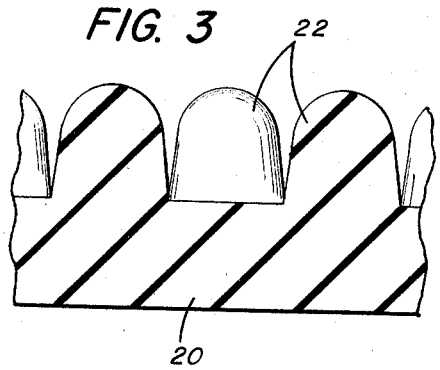
JACK T. BILLINGS
LAWRENCE R. WITHEROW
INVENTORS
BY
ATTORNEYS 3,493,161
WEB SUPPORT ROLLER SURFACE
Jack T. Billings and Lawrence R. Witherow, Rochester, N.Y., assignors to Eastman Kodak Company, Rochester, N.Y., a corporation of New Jersey
Filed Apr. 17, 1967, Ser. No. 631,287
Int. Cl. G03b 1/20; B65h 17/20
U.S. Cl. 226—190                 14 Claims

ABSTRACT OF THE DISCLOSURE

A web support spool having a soft, hobnail-like support surface that reduces the tendency of the spool to scratch the web.

Background of the invention

In processing film it is the usual practice to run the film in a continuous length through a series of tanks containing processing solutions, rinsing solutions, fixing solutions and washing solutions and to then run it through one or more drying cabinets or chambers. A series of film support spools is provided at the top and the bottom of the tanks and the drying cabinets so that the film forms a multiplicity of loops about pairs of spools in passing through each tank and through the drying cabinet. The film may be driven by any means well known in the art, including sprocket wheels or other drive rollers located throughout the processor. It is well known that film normally forms a helix as it passes from one spool to the next in the processor. This helix formation has, in the past, been the source of imperfections in the finished processed film because of the tendency of the film to slide laterally on the spool as it travels thereabout.

In order to prevent lateral scratches from appearing in the image area of the film, it has long been common practice to provide undercut spools which have shulders that contact the film only at the edges, outside of the image area. Even these types of processor spools have damaged the film to varying extents. For example, high tension on the film has caused pressured marking and/or stretching of the film. In addition, it has been found that, as the film forms a helix in passing over an undercut spool, the edges of the film slip laterally across the shoulder surfaces causing hash marks to be formed at the film edges. Such hash marks have not heretofore been a serious problem since the image area on the film did not closely approach the edge thereof. However, with recent developments and changes in film format, attempts have been made to enlarge the area of the image on the film so that the image area of many films now extends closer to the edge than has heretofore been the case. As a result, the hash marks appearing at the edges of the film have begun to intrude into the image area and thus have become objectionable.

In the past, processing spools have been used embodying a flat gum rubber film support surface in an attempt to reduce the amount of film scratching. However, even these surfaces have been found to cause an objectionable amount of surface scratches of the film due, in part, to the sliding of the film as it passes over the spool. These scratches apparently have resulted from the tendency of such flat rubber surfaces to accumulate dirt that becomes imbedded therein which scratches the film surface as it slips over the spool surface.

Attempts have also been made to utilize a processing spool having a film contacting surface comprised of a plurality of O-rings disposed coaxially on a hub. While reducing the problems of the hash mark scratches on the edges of the film, such a processing spool design tends to cause marks on the surface of the film due to the relatively small, constant contact area of the spool with the film which tends to concentrate the surface on which any dirt may be deposited.

Additionally, it has been found that with processing spools of the prior art, differing film sizes must be processed on correspondingly differing sized spools. As a result, should a processing machine be used, for example, for processing 35 mm. film the entire complement of support spools wuld have to be replaced to process 8 mm. film.

Moreover, in processing machines utilizing certain types of drive systems, it has been found that support spool designs of the prior art have provided one limitation to the maximum processing speed possible.

It has thus become increasingly apparent that a film support spool eliminating relative motion between the film and the contacting surface of the spool would be extremely desirable. Furthermore, a spool arrangement permitting the processing of various sizes of film without the necessity of modifying the spools for each specific size would result in substantial economies with respect to both time and cost.

Summary of the invention

Accordingly, the present invention provides a film support spool comprising a cylindrical spool, with or without flanges, having a soft, hobnail-like film contacting surface comprised of a multiplicity of flexible fingers extending radially outward from the hub of the spool.

More particularly, the film support spool of the present invention has a multiplicity of staggered substantially frusto-conically shaped fingers formed of a soft silicone material which has relatively high tensile strength and which is inert in photographic processing solutions. The preferred material has a hardness of approximately 25 to 30 A Durometer. The flexible fingers are provided with a substantially hemispherical outer end and have a length substantially equal to the diameter of the base thereof. The diameter to length relationship of these fingers is such that lateral movement of the film over the spool causes the fingers to deflect with the film motion, so that no relative movement occurs between the surface of the film and the end of each individual finger.

Furthermore, the present invention provides a film support spool having a soft hobnail-like film contacting surface having between 50 and 150 fingers per square inch of spool surface. The base of the fingers may be in contact with adjacent fingers or they may be spaced from the adjacent fingers up to a distance approximately equal to the diameter of the fingers. The height of the fingers above the base is substantially equal to the diameter of the fingers, and the outer surfaces of the fingers taper inwardly from the base to the substantially hemispherical tip.

Additionally, the present invention provides a film support spool having a relatively soft, flexible film contacting surface which provides a maximum amount of support over the full width of the film, while still permitting the film to move laterally by deflecting the surface without relative motion between the film and the surface. At the same time, the spool surface provides a recessed portion between adjacent contacting portions whereby dirt and processing solutions may pe flushed from the film contacting surface of the spool.

Moreover, the surface of the present invention is sufficiently flexible that uneven pressure across the width of the film can be relieved without adversely affecting the film surface. More importantly, the stress relief provided by the present invention in accomplished without relative motion of the film across the spool.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which the preferred embodiments of the present invention are illustrated and described.

Brief description of the drawings

FIG. 1 is an elevation, partially in section, of a film support spool incorporating a specific embodiment of the present invention;

FIG. 2 is a view of the spool taken along line 2—2 of FIG. 1; and

FIG. 3 is an enlarged detail of the fingers forming the surface of the process spool.

Description of the preferred embodiment

FIG. 1 shows an elevation of a film support spool 10, partially in section, having a cylindrical hub portion 12 with a central shaft opening 14. The hub portion 12 may be provided with a pair of flanges 16. The spool hub may be formed of a rigid plastic or metal in a manner well known in the art. The outer surface 18 of the hub of the spool is substantially cylindrical and has a diameter approximately equal to that desired in the final construction. A ring of soft inert material 20, having a multiplicity of radially extending flexible fingers 22 on the outer surface thereof, is arranged to surround the surface 18 of the hub. The fingers may be frusto-conical in shape and have outer ends which are substantially convex or hemispherical. The tips on the end of the fingers are convex or hemispherical to reduce the marking of the film by eliminating flat surfaces on which dirt may accumulate. The fingers 22 may be disposed in rows extending across the width of the spool, with adjacent rows being staggered, substantially as shown, or they may be disposed in a random pattern. In this manner, as the film passes over several spools, the likelihood that any one portion of the film is constantly contacted to the exclusion of other portions of the film is practically eliminated.

The spool may be formed entirely of the soft material, but extremely satisfactory results have been obtained by forming a rigid spool hub, with or without flanges similar to spools of prior art, but without the undercut, and then stretching a molded band, with the fingers integrally molded thereon, over the hub much in the same way that a rubber band or tire would be applied. It has been found that a spool surface having from 50 to 150 fingers per square inch, wherein the length of the fingers is approximately equal to the diameter of the base of the fingers, provides the desired film support and the necessary flexibility. The fingers in a row may be spaced from one another a distance substantially equal to the base diameter of the finger, or they may be spaced so that the bases of the adjacent fingers are in contact. Each of the finger members in the preferred embodiment has a diameter at the base of approximately 0.100 inch and a length of approximately 0.104 inch and have a spacing between adjacent fingers of approximately 0.160 inch. The fingers have a taper from the base to the tip of about 15°. The outer end of each finger is provided with a substantially hemispherical surface having a radius of approximately 0.047 inch.

The soft surface of the spool is formed of a material which has sufficient tensile strength to permit flexing of the fingers without breaking. The material must be one which is substantially inert in the processing solutions so that it will not deteriorate or contaminate the solutions. The material must also be one which will not mark, scratch or leave dirt on the surface of the film. Moreover, the material must be sufficiently soft that it will deform under the influence of the film in contact therewith. Finally, the material must be sufficientlly flexible so that, once the fingers are in contact with the film, they will deflect upon motion of the film, rather than slipping across the surface of the film. At the same time, the fingers must possess sufficient rigidity so that they do not collapse completely when compressed by the film. One material that has been found to be extremely successful for forming the film contacting surface of the present invention is a silicone material sold by the General Electric Company under the identification of SE-5211 and having a hardness of between 25 and 30 on the Durometer A scale.

In operation, as the film comes in contact with the surface of the spool, each increment of the film surface is contacted by the end of one of the fingers. As the film tends to move laterally of the spool surface, due to the helix angle imparted to the film by its path through the processor, each finger member will flex laterally, permitting the film to move across the surface of the spool without relative motion between the film and the fingers. In this manner, with no relative motion between the film and the film contacting surface of the support spool, lateral scratches or marks on any portion of the film are virtually eliminated. Since the individual fingers in the same row are capable of flexing individually, any uneven distribution of force exerted by the film on the spool may be accommodated. Moreover, due to the fact that the end of each finger extends above the major portion of the outer surface of the spool, dirt and processing solutions can not accumulate on the film contacting surface.

As previously noted, by using film support spools as described and illustrated herein, it is possible to process any size film, up to the width of the spools, without the necessity of rethreading the processor or substituting different spools. This is possible with the present invention because of the fact that the fingers provide support for the entire width of the film rather than depending only upon the shoulders at the edge of the spool to support the edge of each film. As a result the quality of the finished product may be substantially improved along with several other desirable and economic side effects as noted above.

While spools utilizing flanges have been described and illustrated herein, it is to be understood that the present invention can be utilized on flangeless spools.

While throughout the foregoing specification reference has been made to the use of the present invention as a film support spool, it will be appreciated that it may be equally advantageous in use with any other web material having a surface subject to damage due to handling.

The invention has been described in detail with particular reference to preferred embodiments thereof, but it will be understood that variations and modifications can be effected within the spirit and scope of the invention as described hereinabove.

We claim:

1. A flanged web support roller for use with a flexible web, said roller being formed of a substantially rigid structural material, said roller having means between said flanges for preventing web marking while supporting said web substantially across the width thereof and permitting lateral motion of said web with respect to the roller axis, said means comprising a web contacting surface formed of a separate elastic sleeve member disposed on the surface of said roller between the flanges and having a multiplicity of laterally and peripherally spaced substantially radially extending elastic fingers, said fingers being laterally staggered with respect to peripherally adjacent fingers.

2. The invention according to claim 1 wherein said web contacting surface is substantially uncrowned.

3. The invention according to claim 1 wherein said fingers are substantially frusto-conical in shape.

4. The invention according to claim 1 wherein said fingers have a height substantially equal to the diameter of the fingers.

5. The invention according to claim 1 wherein said fingers are provided with substantially convex outer ends.

6. A flanged web support roller for use with a flexible web, said roller having means between said flanges for preventing web marking while supporting said web substantially across the width thereof and permitting lateral motion of said web with respect to the roller axis, said means comprising a web contacting surface on said roller comprised of a multiplicity of laterally and peripherally spaced substantially radially extending elastic fingers, said fingers being laterally staggered with respect to peripherally adjacent fingers, said fingers being tapered towards the outer ends to provide sufficient flexibility that said fingers will deflect with movement of the web to minimize relative movement between the web and said fingers.

7. A flanged web support roller for use with a flexible web, said roller having means between said flanges for preventing web marking while supporting said web substantially across the width thereof and permitting lateral motion of said web with respect to the roller axis, said means comprising a web contacting surface on said roller comprised of a multiplicity of laterally and peripherally spaced substantially radially extending elastic fingers, said fingers being laterally staggered with respect to peripherally adjacent fingers, said web contacting surface containing between 50 and 150 fingers per square inch of roller surface.

8. A flanged web support roller for use with a flexible web, said roller having means between said flanges for preventing web marking while supporting said web substantially across the width thereof and permitting lateral motion of said web with respect to the roller axis, said means comprising a web contacting surface on said roller comprised of a multiplicity of laterally and peripherally spaced substantially radially extending elastic fingers, said fingers being laterally staggered with respect to peripherally adjacent fingers, said fingers being formed essentially of a soft silicone material which has relatively high tensile strength and a hardness of approximately 25 to 30 A Durometer.

9. A sleeve for use as the web supporting peripheral surface on a rigid flanged web support roller, said sleeve having means for preventing web marking while supporting said web substantially across the width thereof and permitting lateral motion of said web with respect to the roller axis, said means comprising a web contacting surface on said sleeve comprised of a multiplicity of laterally and peripherally spaced substantially radially extending elastic fingers, said fingers being laterally staggered with respect to peripherally adjacent fingers.

10. The invention according to claim 9 wherein said sleeve is flexible and elastic and the fingers are substantially frusto-conical in shape.

11. The invention according to claim 9 wherein said fingers have a height substantially equal to the diameter of the fingers.

12. The invention according to claim 9 wherein said fingers are provided with substantially convex outer ends.

13. The invention according to claim 9 wherein said fingers are tapered towards the outer ends to provide sufficient flexibility that said fingers will deflect with movement between the web and said roller axis.

14. A web support roller for use with a flexible web having easily marked surfaces, said roller having means for preventing marking of the web surface while supporting the web substantially across the width thereof and permitting lateral movement of the web with respect to the roller axis, said roller being formed of a substantially rigid structural material, said means comprising a sleeve member disposed on the peripheral surface of said roller and having a multiplicity of laterally and peripherally spaced substantially radially extending elastic fingers, said fingers being laterally staggered with respect to peripherally adjacent fingers, said sleeve member and said fingers being formed of a relatively soft, elastic material which is substantially inert in photographic processing solutions.

References Cited

UNITED STATES PATENTS

| | | | |
|---|---|---|---|
| 1,763,945 | 6/1930 | Bedford | 242—68.5 |
| 2,792,185 | 4/1957 | Julliard | 242—74 |
| 3,254,856 | 6/1966 | Camras | 242—71.8 XR |
| 3,339,818 | 9/1967 | Morrow | 226—190 |
| 3,345,928 | 10/1967 | Krehbiel | 95—94 |

GEORGE F. MAUTZ, Primary Examiner

U.S. Cl. X.R.

242—68.5, 76